UNITED STATES PATENT OFFICE.

PAUL NEUMANN AND JOSEF ZELTNER, OF CHARLOTTENBURG, GERMANY.

PROCESS FOR THE PRODUCTION OF THE ESTERS OF THE TERTIARY ALCOHOLS.

1,123,572. Specification of Letters Patent. Patented Jan. 5, 1915.

No Drawing. Application filed November 6, 1913. Serial No. 799,604.

*To all whom it may concern:*

Be it known that we, PAUL NEUMANN, a subject of the German Emperor, and JOSEF ZELTNER, a subject of the Russian Emperor, and residing at Charlottenburg, Germany, have invented a certain new and useful Improved Process for the Production of the Esters of the Tertiary Alcohols, of which the following is a specification.

This invention relates to a process for the production of the esters of the tertiary alcohols. Heretofore the production of the esters of the tertiary alcohols has been more difficult than the production of esters of the primary and secondary alcohols. For example from the action of acids on the tertiary amyl alcohol, only traces of the corresponding esters are obtained. If larger yields of these compounds are desired, it is necessary to treat the corresponding acid with amylen and with zinc chlorid (Kondakoff, *Journal of the Russ-Phys.—Chem. Soc.* 1893, 25 439). Further, treating the acid chlorids and tertiary amyl alcohol does not give satisfactory results as the reaction is an abnormal one. For example, the action of acetyl chlorid on tertiary amyl alcohol does not produce the acetic ester of amylenhydrate as would be expected but merely yields the tertiary amyl chlorid and acetic acid.

The chief feature of this invention is that the esters of the tertiary alcohols may be obtained from the acid chlorids if the reaction be carried out in the presence of a tertiary base.

It is known that the carbamic ester of the tertiary alcohols is produced from carbamic chlorid in the presence of tertiary bases. However the next homologous chlorid to the carbamic chlorid namely the chlorid of carbonic acid cannot be converted into an ester of a tertiary alcohol in the presence of tertiary bases. Consequently it did not appear to be at all probable that other acids or chlorids would form esters with tertiary alcohols in the presence of tertiary bases; according to this invention, however, the carboxylic esters of the tertiary alcohols have been obtained by dissolving the necessary compounds for their production in a tertiary base, for example, pyridin, at normal temperature or on gently heating.

Example I: 44 grams of tertiary amyl alcohol are dissolved in 55 grams of pyridin and 64 grams of valeryl chlorid added. The mixture is allowed to stand for 24 hours at normal indoor temperature and water and hydrochloric acid are added to the mixture and the tertiary amyl valerate is separated and distilled *in vacuo*. The distillate boils at 75° C. at a pressure of approximately 15 mm. and possesses the properties described in the literature on the subject.

Example II: 88 grams of tertiary amyl alcohol are dissolved in 14.0 grams of dimtheylanilin and 177 grams of cinnamyl chlorid are gradually added. After a lapse of 24 hours the product is treated as in Example I and the tertiary amyl cinnamate, an ester hitherto unobtainable and a good yield of which is now obtained, is distilled over. It boils at a pressure of approximately 15 mm. at a temperature of from 150–155° C. The ester is an almost colorless liquid with a slight odor. Two atoms of bromin can readily be added whereby a bromin derivative is obtained which is difficult to distil and very stable and which solidifies in a freezing mixture. It melts at a temperature of 39 to 40° C.

Example III: 37 grams bromovaleryl chlorid are caused to react with 15 grams of tertiary amyl alcohol and 30 grams of dimethylanilin. On warming on the water bath dimethylanilin hydrobromid separates out. The product of the reaction is washed with water, then with sodium carbonate and the tertiary amyl bromovalerate is distilled *in vacuo*. The substance boils at 133° C. to 115° at 13 mm. pressure and is a water-colored liquid having a slight odor and a neutral reaction.

Example IV: 88 grams of tertiary amyl alcohol, 150 grams of dimethylanilin and 140 grams of benzoyl chlorid are mixed together and heated for some hours at 90° C. The mixture is treated in succession with water, by hydrochloric acid and sodium carbonate and the amyl benzoate is distilled over. The boiling point is 120° C. to 123° C. at a pressure of 13 mm.

Example V: 50 grams of tertiary amyl alcohol are dissolved in 50 grams of pyridin mixed with 100 grams of p-nitrobenzoic chlorid. When the reaction is complete the mixture is treated in the manner indicated in Example IV and the ester obtained which melts at 48° C. after recrystallizing out the methyl alcohol. By the action of reducing agents upon this substance the corresponding amin ester is obtained which melts at 58° C. to 59° C. It crystallizes in white needle shaped crystals and can be crystallized out from ligroin.

Example VI: 17.6 grams of tertiary amyl alcohol are dissolved in 25 grams of dimethylanilin and 16 grams of acetyl chlorid are added while cooling. A vigorous reaction takes place and dimethylanilin hydrochlorid separates out.

The tertiary amylacetate boils at 121° C. to 123° C. at ordinary pressure.

We claim:

1. A process for the production of tertiary alcohol esters of organic acids having their carboxyl group attached to carbon consisting in mixing tertiary alcohols with the tertiary bases and then adding to the mixture chlorids of said organic acids.

2. A process for the production of tertiary alcohol esters of organic acids having their carboxyl group attached to carbon, consisting in causing chlorids of organic acids to react with tertiary alcohols in the presence of tertiary bases.

In testimony whereof we affix our signatures in the presence of two witnesses.

PAUL NEUMANN.
JOSEF ZELTNER.

Witnesses:
HENRY HASPER,
WOLDEMAR HAUPT.